March 5, 1940.  E. H. LINDEMAN  2,192,646
VEHICLE SPRING
Filed Sept. 17, 1938
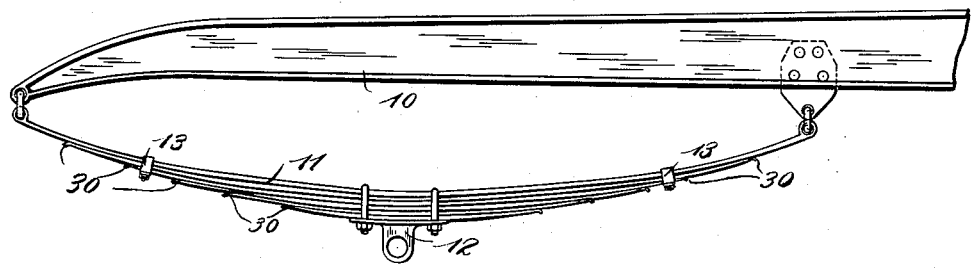
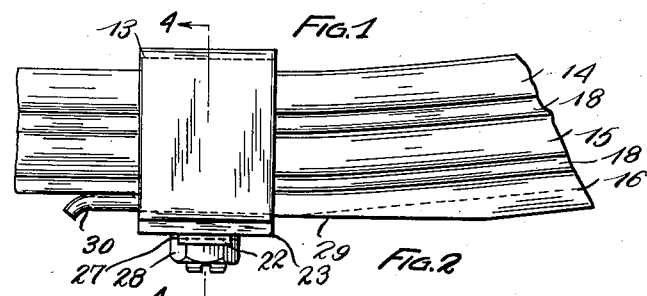
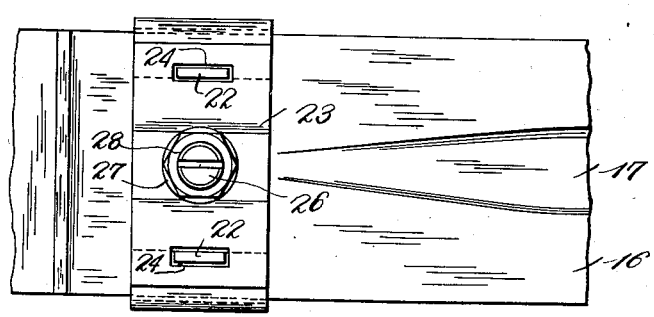
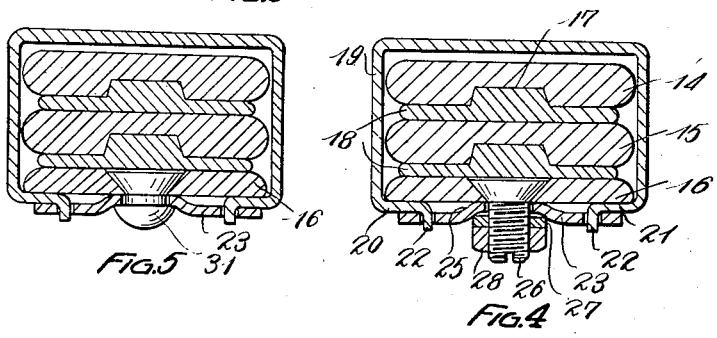
INVENTOR.
EDWARD H. LINDEMAN
BY Kwis Hudson & Kent
ATTORNEYS Patented Mar. 5, 1940

2,192,646

UNITED STATES PATENT OFFICE 2,192,646

VEHICLE SPRING

Edward H. Lindeman, Detroit, Mich., assignor to Eaton Manufacturing Company, Cleveland, Ohio, a corporation of Ohio Application September 17, 1938, Serial No. 230,468

3 Claims. (Cl. 267—53)

This invention relates to vehicle springs and more particularly to an improved form of clip for the purpose of keeping a plurality of leaf springs in alignment.

The principal object of the invention is to provide a form of spring clip that will be attached to and move with one of the leaves but be spaced from the other leaves so as to avoid restricting the free longitudinal movement of the leaves and to eliminate squeaks which might result from a leaf rubbing on the clip.

A further object of the invention is to provide an improved form of spring clip that may be manufactured at a low cost and be easily assembled with the spring leaves and also readily detachable therefrom when it is necessary to separate the leaves for purposes of repair or otherwise.

Other objects of the invention and the features of novelty will be apparent from the following description taken in connection with the accompanying drawing, in which Fig. 1 is a side elevation of a portion of a vehicle frame having assembled therewith a leaf spring embodying my invention.

Fig. 2 is an enlarged side elevation of a spring clip embodying my invention, the clip being shown in assembled relation with a plurality of leaves.

Fig. 3 is a bottom plan of the construction as illustrated in Fig. 2.

Fig. 4 is a transverse section on the line 4—4 of Fig. 2.

Fig. 5 is a view similar to Fig. 4 but showing a slight modification.

Referring to the drawing, 10 indicates one of the side members of a vehicle frame and 11 a common form of leaf spring that is attached to an axle 12. In leaf springs it is common practice to provide clips, such as indicated at 13, to hold the leaves in alignment.

Referring particularly to Figs. 2, 3 and 4, I have illustrated therein a series of spring leaves 14, 15 and 16 which may be of any preferred cross section, but which I have illustrated as provided with longitudinal grooves 17 in their bottom surface. I have also shown liners 18 between the leaves, these being frequently used for purposes of lubrication but that may be omitted and my invention is in no wise limited to their use.

My improved clip comprises a substantially rectangular band 19 which encloses the leaves but has its top and side portions spaced from the upper leaf and the edges of all of the leaves as clearly illustrated in Fig. 4. The terminal portions 20 and 21 are turned inwardly to engage the under surface of the bottom leaf 16 and provided with lugs 22 which project downwardly away from the leaf 16. A plate 23 has perforations 24 to receive the lugs 22 and thus forms a connection between the ends of the band 19. The central portion of the plate 23 is preferably deflected upwardly toward the leaf 16, as indicated at 25, and provided with an opening for the bolt 26 which is arranged in an opening in the leaf 16 and has a lock washer 27 and a nut 28 by means of which the plate 23 is caused to clamp the terminal portions 20 of the band 19 against the under side of the leaf 16. By deflecting the central portion of the plate 23 upwardly, as shown in Fig. 4, the bending of the plate, when the nut 28 is tightened, is limited by the engagement of the central portion of the plate 23 with the under surface of the leaf 16.

From the foregoing description and the drawing it will be evident that the spring clip, as a whole, is attached to the leaf 16 and is entirely free from the leaves 14 and 15 so that the relative longitudinal movements of these leaves is not restricted and the causes for squeaks due to high pressures between the leaves 14 and 15 with the band 19, are eliminated.

My improved spring clip may be readily removed, whenever desired, by simply taking off the nut 28 and the lock washer 27 which permits the removal of the plate 23. The band 19 will then be free to slide along the spring to a position where it is out of the way, or it may be entirely removed by a separation of the terminal portions 26 sufficiently to allow the band 19 to be taken off the spring.

When the spring leaves are made of steel having the longitudinal groove 17 therein, as shown in the drawing, it is desirable to eliminate the groove at the end portion of the leaf to which my improved clip is attached and, as will be seen from Fig. 2, this is accomplished by tapering the end portion of the leaf, as indicated at 29, sufficiently to obliterate the groove 17 and provide a smooth flat surface to which the clip may be attached. This tapering of the end portion of the leaf also tends to increase its flexibility and avoids the concentration of stresses which would result from maintaining the full thickness of the leaf throughout the end portion thereof. The end of the tapered portion of the leaf 16 is turned outwardly, as indicated at 30, to avoid any tendency for the end of the leaf to gouge into the adjoining leaf or liner.

Fig. 5 illustrates a modification in which the bolt 26 nut 28 and lock washer 27 are replaced by a rivet-type of bolt 31 which, while being lower in cost and serving to effectively clamp the plate 23 to the plate 16, lacks the advantage of convenient detachability that is afforded by a bolt and nut.

Having thus described my invention, I claim:

1. A spring clip for a leaf spring, comprising a band adapted to surround a plurality of leaves and provided with a pair of outwardly projecting lugs, a plate adapted to overlie the terminal portions of said band and having perforations to receive said lugs, said plate also having a perforation adapted to receive a bolt, and a bolt in the last mentioned perforation for clamping the terminal portions of said band between said plate and a spring leaf.

2. In a leaf spring, the combination of a plurality of leaves, a band surrounding said leaves and spaced from the edges thereof and the outer surface of one of the outer leaves, the terminal portions of said band engaging the outer surface of the other outer leaf and being provided with lugs which extend outwardly from the last mentioned surface, a plate overlying the terminal portions of said band and having perforations adjacent its ends to receive said lugs and also having a central perforation, and a bolt carried by the last mentioned leaf and extending through said central perforation for clamping the terminal portions of said band between said plate and the last mentioned leaf.

3. A spring clip for a leaf spring comprising a band adapted to surround a plurality of leaves with its ends spaced apart and engaging the side of one of said leaves, said band being spaced from the other leaves, a plate overlying said ends, means positively connecting said ends with said plate to hold said ends against displacement relative to the plate, and clamping means for securing said plate to the said leaf that is engaged by said ends.

EDWARD H. LINDEMAN.